US010574726B2

(12) United States Patent
Goossens

(10) Patent No.: US 10,574,726 B2
(45) Date of Patent: Feb. 25, 2020

(54) TECHNIQUES FOR ATTACHING MEDIA CAPTURED BY A MOBILE COMPUTING DEVICE TO AN ELECTRONIC DOCUMENT

(71) Applicant: Google LLC, Mountain View, CA (US)

(72) Inventor: Erik Hubert Dolly Goossens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 531 days.

(21) Appl. No.: 14/885,513

(22) Filed: Oct. 16, 2015

(65) Prior Publication Data

US 2017/0244780 A1 Aug. 24, 2017

(51) Int. Cl.
*H04L 29/08* (2006.01)
*H04W 4/80* (2018.01)
(Continued)

(52) U.S. Cl.
CPC .......... *H04L 67/06* (2013.01); *H04L 12/6418* (2013.01); *H04L 65/60* (2013.01); *H04W 4/80* (2018.02)

(58) Field of Classification Search
CPC ........ H04L 67/06; H04W 4/008; G06F 17/24; G06F 17/212; G06F 3/0486; H04N 5/23293
See application file for complete search history.

(56) References Cited

U.S. PATENT DOCUMENTS 6,476,858 B1 * 11/2002 Ramirez Diaz .... G08B 13/1961
348/152
8,027,662 B1 * 9/2011 Miller ..................... H04L 67/18
455/17

(Continued)

FOREIGN PATENT DOCUMENTS

CN 108476152 8/2018
DE 112016004733 7/2018

(Continued)

OTHER PUBLICATIONS

PCT International Search Report and Written Opinion dated Jan. 3, 2017 for PCT International Application No. PCT/US2016/056597 (12 pages).

(Continued)

*Primary Examiner* — Caroline H Jahnige
(74) *Attorney, Agent, or Firm* — IP Spring

(57) ABSTRACT

A computer-implemented technique can include establishing, between a computing device and a mobile computing device, a short-range wireless communication link. In response to establishing the communication link, the computing device can provide a selectable option for a user to attach a media item to an electronic document accessed by the computing device. In response to a user selection of the selectable option, the computing device can transmit, to the mobile computing device via the communication link, a command, wherein receipt of the command causes the mobile computing device to initiate a media capture mode. The computing device can then receive, from the mobile computing device via the communication link, the captured media item and, in response to receiving the captured media item, the computing device can attach the captured media item to the electronic document.

20 Claims, 3 Drawing Sheets

(51) Int. Cl.
*H04L 29/06* (2006.01)
*H04L 12/64* (2006.01)

(56) References Cited

U.S. PATENT DOCUMENTS

| | | | |
|---|---|---|---|
| 8,819,247 | B2 | 8/2014 | Hymel |
| 9,009,805 | B1 | 4/2015 | Kirkby et al. |
| 9,100,588 | B1 | 8/2015 | Seymour |
| 2006/0189349 | A1 | 8/2006 | Montulli et al. |
| 2007/0085674 | A1 | 4/2007 | Sharpe |
| 2007/0186158 | A1* | 8/2007 | Kim .................... G06F 3/04883 715/210 |
| 2007/0254640 | A1* | 11/2007 | Bliss ................. H04M 1/72533 455/420 |
| 2008/0297617 | A1* | 12/2008 | Jeong ................. H04N 5/23219 348/222.1 |
| 2009/0135204 | A1* | 5/2009 | Royal ...................... G06T 11/60 345/667 |
| 2010/0066485 | A1* | 3/2010 | Hyatt ..................... H04N 5/232 340/3.71 |
| 2010/0205537 | A1* | 8/2010 | Knighton ................. H04N 7/15 715/751 |
| 2010/0293598 | A1* | 11/2010 | Collart .............. G06F 17/30056 726/3 |
| 2012/0036441 | A1 | 2/2012 | Basir et al. |
| 2013/0147933 | A1* | 6/2013 | Kulas ............... H04N 21/41407 348/61 |
| 2016/0073036 | A1* | 3/2016 | Chen ................. H04N 5/23293 348/231.2 |
| 2016/0253298 | A1* | 9/2016 | Kim ....................... G06F 17/24 715/201 |

FOREIGN PATENT DOCUMENTS

| | | |
|---|---|---|
| GB | 2558143 | 7/2018 |
| JP | 2012-256319 | 12/2012 |
| JP | 2014-171138 | 9/2014 |
| JP | 2014171138 | 9/2014 |
| JP | 2015-082729 | 4/2015 |
| JP | 2015-088787 | 5/2015 |
| JP | 2015-146522 | 8/2015 |
| JP | 2015146522 | 8/2015 |
| KR | 20180054745 | 5/2018 |
| WO | 2017066293 | 4/2017 |

OTHER PUBLICATIONS

Sherman, J., "How to Wirelessly Connect Your Android Phone and PC With Airdroid," Digital Trends, Apr. 19, 2013, 5 pages.

Sujith, "Access Your Android Phone SD Card Data Through WiFi With Droid Over WiFi," Tech Line Info, Oct. 27, 2013, 2 pages.

EPO, International Preliminary Report on Patentability for International Patent Application No. PCT/US2016/056597, dated Apr. 17, 2018, 9 Pages.

KIPO, Notice of Preliminary Rejection mailed for Korean application No. 10-2018-7010734, dated May 31, 2019, 4 pages.

JPO, Office Action for Japanese Patent Application No. 2018-519379, dated Apr. 9, 2019, 4 pages.

JPO, Notice of Allowance (with English translation) for Japanese Patent Application No. 2018-519379, dated Oct. 29, 2019, 2 pages

* cited by examiner

US 10,574,726 B2

TECHNIQUES FOR ATTACHING MEDIA CAPTURED BY A MOBILE COMPUTING DEVICE TO AN ELECTRONIC DOCUMENT

FIELD

The present application generally relates to mobile computing devices and, more particularly, to techniques for attaching media captured by a mobile computing device to an electronic document.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users can attach media items (e.g., photos or videos) to various electronic documents, such as emails and slide presentations. Users typically draft and edit such electronic documents at a desktop or laptop computing device because these types of devices have physical keyboards and other input devices (e.g., mice or trackballs/trackpads) that make it easier for the user to quickly and efficiently provide their input. These types of devices, however, are typically difficult to utilize to capture the media item because they are bulky and their components are typically wired. Thus, users typically use their mobile computing devices, such as mobile phones or tablet computers, to capture the media item. The transferring of the captured media item to the other computing device accessing the electronic document, however, is time consuming.

SUMMARY

A computer-implemented technique can include establishing, between a computing device and a mobile computing device, a short-range wireless communication link; in response to establishing the short-range wireless communication link, providing, by the computing device, a selectable option for a user to attach a media item to an electronic document accessed by the computing device; in response to a user selection of the selectable option, transmitting, from the computing device to the mobile computing device via the short-range wireless communication link, a command, the command configured to cause the mobile computing device to initiate a media capture mode during which the media item is captured by a camera of the mobile computing device; receiving, at the computing device from the mobile computing device via the short-range wireless communication link, the captured media item; and in response to receiving the captured media item, attaching, by the computing device, the captured media item to the electronic document.

In some embodiments, the technique can further comprise during the media capture mode: receiving, at the computing device from the mobile computing device via the short-range wireless communication link, a media feed of a current view of the camera of the mobile computing device; and displaying, by the computing device, a preview window that includes the media feed. In some embodiments, the media item is captured during the media capture mode in response to an input from a user. In other embodiments, the media item is captured automatically based on what is recognized in the preview window.

In some embodiments, the technique can further comprise determining, by the computing device, whether the computing device and the mobile computing device are associated with a same user account. In some embodiments, the technique can further comprise providing the selectable option in response to determining that the computing device and the mobile computing device are both logged into the same user account.

In some embodiments, the media capture mode is terminated in response to a selection by the user at the mobile computing device. In some embodiments, the technique can further comprise providing the selectable option in a menu in response to a click by a user of a mouse or a trackball/trackpad of the computing device. In some embodiments, the electronic document is a web-based electronic document hosted by a remote server. In some embodiments, the short-range wireless communication link is via Bluetooth or WiFi Direct. In some embodiments, the captured media item is a photo or a video.

Another computer-implemented technique is also presented. The technique can include establishing, between a mobile computing device and a computing device, a short-range wireless communication link; receiving, at the mobile computing device and from the computing device via the short-range wireless communication link, a command to initiate a media capture mode for capturing a media item; in response to receiving the command, initiating, by the mobile computing device, the media capture mode and capturing, by a camera of the mobile computing device, the media item; and in response to a termination of the media capture mode, transmitting, from the mobile computing device to the computing device via the short-range wireless communication link, the captured media item, wherein receipt of the captured media item causes the computing device to attach the captured media item to an electronic document being accessed by the computing device when the command was transmitted.

In some embodiments, the technique can include during the media capture mode, transmitting, from the mobile computing device to the computing device via the short-range wireless communication link, a media feed of a current view of the camera of the mobile computing device, wherein receipt of the media feed causes the computing device to display a preview window that includes the media feed. In some embodiments, the media item is captured during the media capture mode in response to an input from a user. In other embodiments, the media item is captured automatically based on what is recognized in the preview window.

In some embodiments, the technique can further comprise determining, by the mobile computing device, whether the mobile computing device and the computing device are associated with a same user account. In some embodiments, the technique can further comprise communicating with the computing device in response to determining that the mobile computing device and the mobile computing device are both logged into the same user account, wherein the communicating causes the computing device to display a selectable option to a user and, upon the user's selection of the selectable option, to transmit the command to the mobile computing device.

In some embodiments, the technique can further comprise: receiving, a termination input from a user of the mobile input device during the media capture mode; and in response to receiving the termination input, terminating, by the mobile computing device, the media capture mode. In some embodiments, the termination input is a touch input provided via a touchscreen of the mobile computing device.

In some embodiments, the electronic document is a web-based electronic document hosted by a remote server. In some embodiments, the short-range wireless communication link is via Bluetooth or WiFi Direct. In some embodiments, the captured media item is a photo, an audio file, a video file, or an audio/video file.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
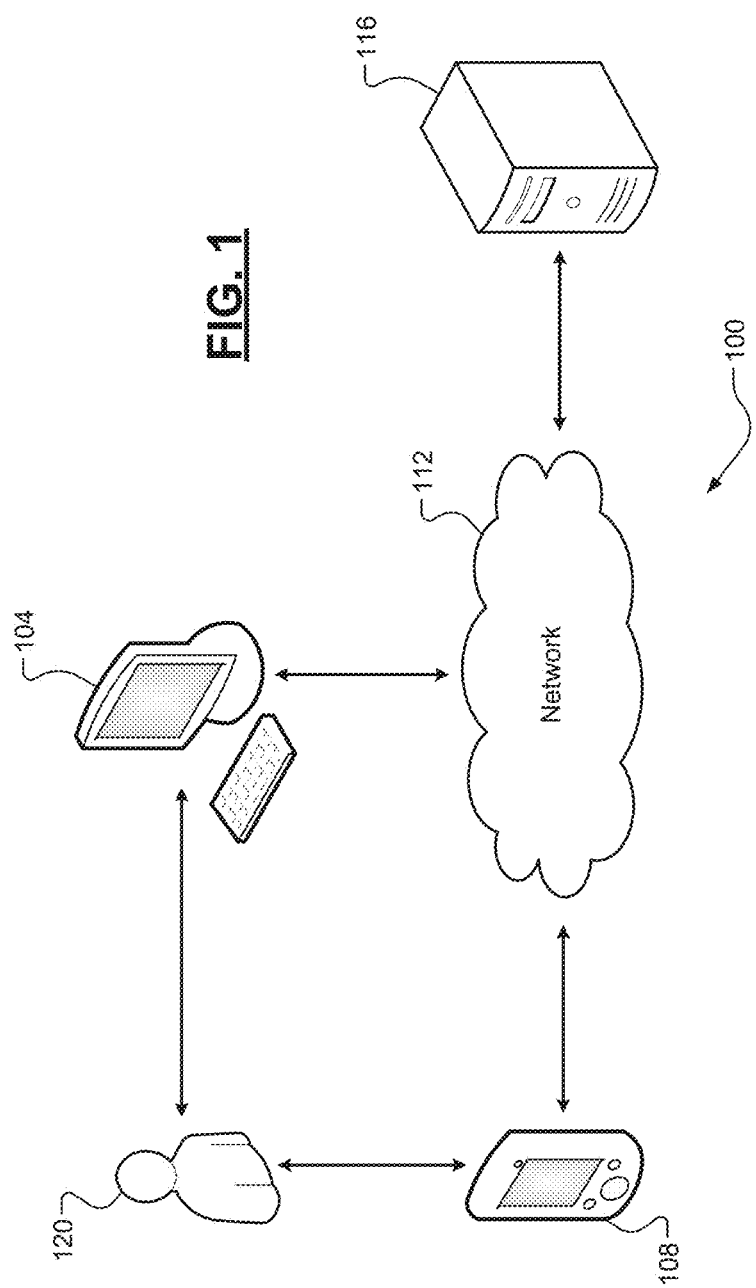
FIG. 1 is a diagram of an example computing system according to some implementations of the present disclosure.

After a user captures media (a "media item") at their mobile computing device, the user must then find a way to transfer the captured media item to another computing device accessing an electronic document to which they wish to attach the captured media item. For example, the user can email the captured media item to herself/himself and then retrieve it via an email application at the other computing device. This process is very cumbersome for the user. Other techniques involve the mobile computing device being accessed by the other computing device like a removable drive, but such techniques still require additional steps for the user (e.g., access the removable drive, find the captured media item, drag and drop into electronic document). Such techniques also do not allow the user to capture the media item quickly in real-time. Accordingly, techniques are presented for attaching media captured by a mobile computing device to an electronic document.

These techniques can provide for quick and seamless attachment of captured media items to the electronic document. The term "attach" as used herein can refer to any suitable method of associating the captured media item with the electronic document, such as attaching the captured media item as an external or separate file (e.g., an email attachment) inserting/embedding the captured media item into the electronic document (e.g., a photo/video inserted into a slide presentation), storing the captured media item in association with the electronic document, and the like. While generally described with respect to another computing device (e.g., a laptop computer or desktop computer), it will be appreciated that these techniques can also be implemented entirely at the mobile computing device. For example, during access of an electronic document by the mobile computing device, a selectable option can cause the mobile computing device to initiate the media capture mode (e.g., a separate application) for capturing the media item, which can then be automatically attached to the electronic document.

In situations in which the systems discussed here collect personal information about users, or may make use of personal information, the users may be provided with an opportunity (e.g., via authorization or consent) to control whether programs or features collect user information (e.g., information about a user's social network, social actions or activities, profession, a user's preferences, or a user's current location), or to control whether and/or how to receive content from a server or other device that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used, e.g., by the server or other device.

Referring now to FIG. 1, a diagram of an example computer system 100 is illustrated. The computer system 100 can include an example computing device 104 and an example mobile computing device 108 according to some implementations of the present disclosure. The computing device 104 can have more capable/accessible input devices (e.g., a physical keyboard and a mouse or trackball/trackpad) compared to the mobile computing device 108 (e.g., a touchscreen). The mobile computing device 108 can also include a camera configured to capture a media item (e.g., a photo or video). Non-limiting examples of the computing device 104 include a desktop computer and a laptop computer and examples of the mobile computing device 108 include a mobile phone and a tablet computer. It will be appreciated that the computing device 104 could also be a mobile phone or a tablet computer (e.g., an older device or a device without a camera). A user 120 can operate the computing device 104 and the mobile computing device 108 (e.g., by providing an input to capture the media item).

The computing device 104 and the mobile computing device 108 can each include a communication device (e.g., a transceiver) that enables them to communicate via a network 112. The network 112 can be a short-range wireless communication network. Examples of the short-range wireless communication medium include Bluetooth and WiFi Direct, although other suitable wireless communication mediums could also be used (WiFi, near field communication (NFC), etc.). When the mobile computing device 108 is proximate to the computing device 104, a short-range wireless communication link can be established between the devices 104, 108. The devices 104, 108 can also each include one or more processors and a memory (flash, hard disk, etc.). The term "processor" as used herein can refer to both a single processor and a plurality of processors operating in a parallel or distributed architecture.

One or both of the devices 104, 108 may also communicate with a remote server 116 via the network 112. In such implementations, the network 112 may include a local area network (LAN), a wide area network (WAN), e.g., the Internet, or a combination thereof. In some implementations, the short-range wireless communication link can be established when the devices 104, 108 are proximate each other and are both associated (e.g., logged in) to a common account, such as an email account. This association can be determined or verified using the server 116. As previously discussed, the electronic document may be a web-based document, and thus the server 116 may host (i.e., provide and store/maintain) the electronic document. In some implementations, the server 116 can transmit information to the computing device 104 that causes the computing device 104 to provide a selectable option for the techniques of the present disclosure, which is discussed in greater detail below.

Figure 2:
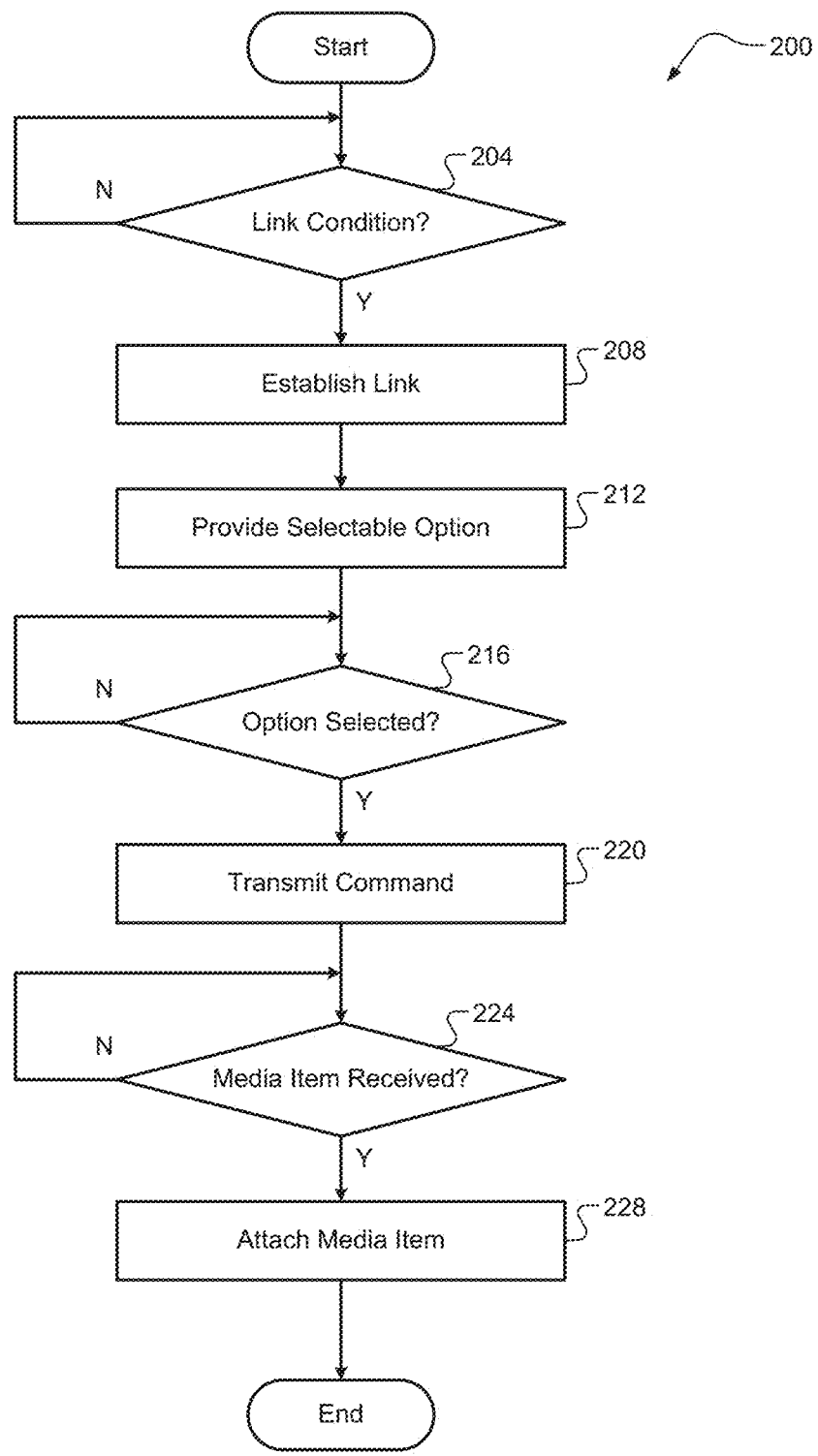
FIG. 2 is a flow diagram of a first example technique for attaching media captured by a mobile computing device to an electronic document at another computing device according to some implementations of the present disclosure.

Referring now to FIG. 2, a flow diagram of a first example technique 200 for attaching media captured by a mobile computing device to an electronic document at another computing device is illustrated. At 204, the computing device 104 can determine whether a link condition exists for establishing a short-range wireless communication link with the mobile computing device 108. The link condition may include the mobile computing device 108 being proximate to the computing device 104. In some implementations, the link condition may further include the devices 104, 108 being associated with (e.g., logged in to) a same user account. If the link condition exists, the technique 200 can proceed to 208. Otherwise, the technique 200 can end or return to 204. At 208, the devices 104, 108 can establish the short-range wireless communication link between themselves. At 212, the computing device 104 can provide a selectable option for the user 120 to attach a media item to an electronic document accessed (e.g., being drafted or edited) by the computing device 104.

In one implementation, the electronic document is a web-based electronic document displayed in a web browser at the computing device 104. Examples of the web-based electronic document include a web-based email and a web-based text or slide presentation document. For example, the web-based electronic document may be stored/maintained at the server 116. In some implementations, the selectable option may be included in a displayed menu, such as after a right-click of a mouse. For example only, the selectable option could be labeled "Insert Photo/Video From Mobile Device" and could be located under the Insert menu. In certain cases, the selectable option may ask the user 120 to specify which type of media item (e.g., photo, audio, video, audio/video) and can then configure the command to the mobile computing device 108 accordingly. At 216, the computing device 104 can determine whether the selectable option has been selected by the user 120. For example, the user 120 may click a mouse or a trackball/trackpad of the computing device 104 to select the selectable option. If the selectable option has been selected, the technique 200 can proceed to 220. Otherwise, the technique 200 can end or return to 216. The command may vary depending on the selectable option (e.g., photo vs. video) such that the command is instructive to the mobile computing device 108 as to how to respond (e.g., initiate a different application or mode).

At 220, the computing device 104 can transmit a command to the mobile computing device 108. Receipt of the command can cause the mobile computing device 108 to initiate an image capture mode for capturing a media item. The image capture mode could be a native photo/video capture mode of the mobile computing device 108 or a separate media capture application launched by the mobile computing device 108 in response to receiving the command. During the media capture mode, the user 120 can manipulate the mobile computing device 108 to capture a photo or a video. This may include providing a start input (e.g., a capture or record button). While photo and video media items are specifically discussed herein, it will be appreciated that audio-only capture could be performed. Upon termination of the media capture mode, the captured media item can be transmitted from the mobile computing device 108 back to the computing device 104 via the short-range wireless communication link.

In some implementations, during the media capture mode, the mobile computing device 108 can transmit a media feed of a current view of its camera to the computing device 104 via the short-range wireless communication link. This "live" or "real-time" media feed can cause the computing device 104 to open a preview window and display the media feed therein. The user 120 can then view how the image(s) that would be captured by the mobile computing device 108 would look with respect to the electronic document at the computing device 104. In some implementations, the preview window could be a pop-up window that overlays at least a portion of the electronic document. Other configurations could also be used, such as inserting the media feed in-line in the electronic document where the user 120 originally clicked to have the captured media item inserted. In some implementations, the media item can be automatically captured based on what is recognized, e.g., in the media feed/preview window. For example only, based on an identified context of the document (discussion of a house), the media item could be captured when a house is recognized in the media feed/preview window.

At 224, the computing device 104 can determine whether the captured media item has been received. If the captured media item has been received, the technique 200 can proceed to 228. Otherwise, the technique 200 can end or return to 220. At 228, the computing device 104 can attach the captured media item to the electronic document. When the electronic document is an email, for example, the captured media could be attached to the email. When the electronic document is a slide presentation, for example, the captured media could be inserted into a current slide. The location for inserting the captured media item within the electronic document may correspond to a location where the initial selection of the selectable command was performed (e.g., an initial right-click). The technique 200 can then end or return to 204 for one or more additional cycles.

Figure 3:
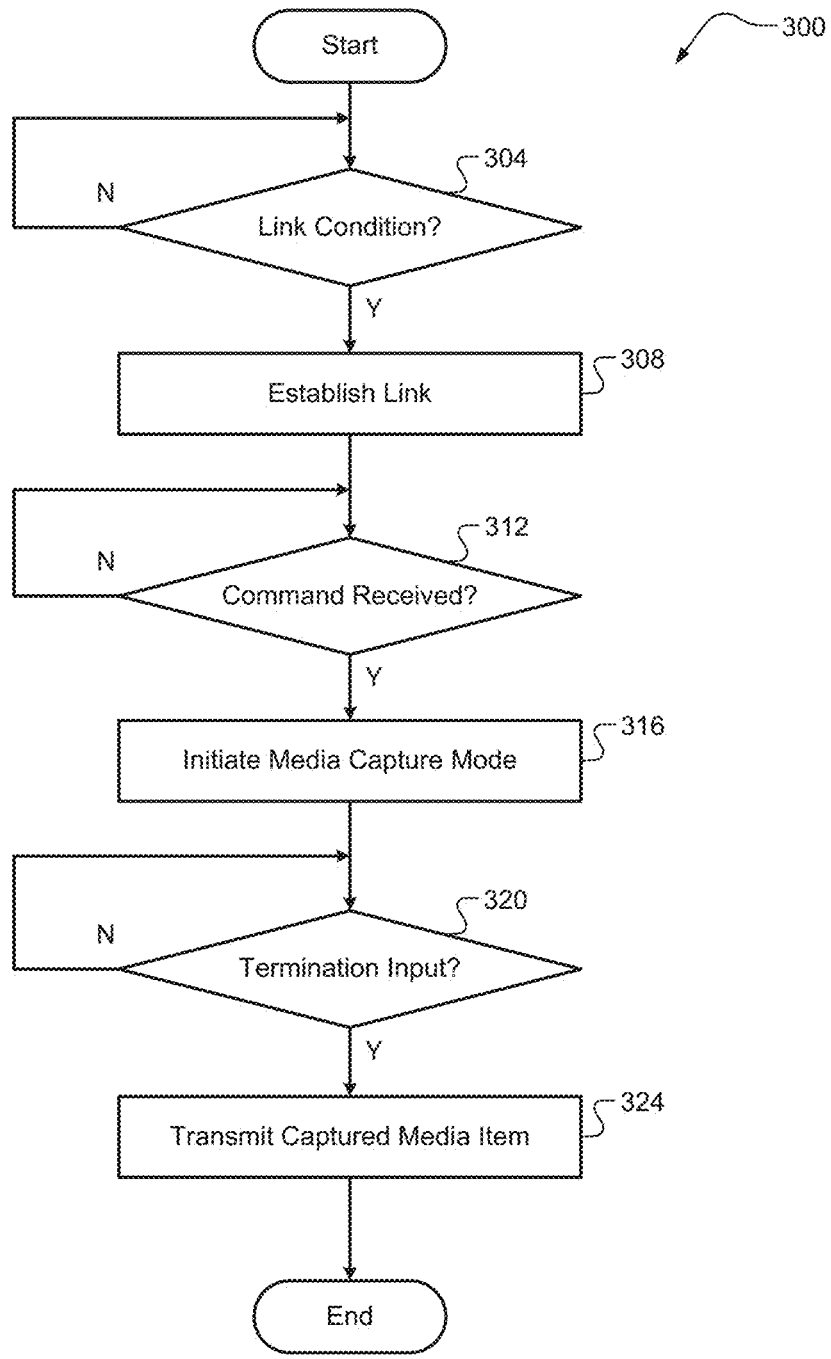
FIG. 3 is a flow diagram of a second example technique for attaching media captured by a mobile computing device to an electronic document according to some implementations of the present disclosure.

Referring now to FIG. 3, a flow diagram of a second example technique 300 for attaching media captured by a mobile computing device to an electronic document at another computing device is illustrated. This technique 300 can represent the technique 200 of FIG. 2 but from the perspective of the mobile computing device 108. At 304, the mobile computing device 108 can determine whether the link condition exists for establishing a short-range wireless communication link with the computing device 104. If the link condition exists, the technique 300 can proceed to 308. Otherwise, the technique 300 can end or return to 304. At 308, the devices 108, 104 can establish the short-range wireless communication link between themselves. At 312, the mobile computing device 108 can determine whether the command has been received. As previously discussed, the command can be transmitted by the computing device 104 in response to a selection of the selectable option by the user 120. If the command has been received, the technique 300 can proceed to 316. Otherwise, the technique 300 can end or return to 312.

At 316, the mobile computing device 108 can initiate the media capture mode. As previously discussed, during the media capture mode, the mobile computing device 108 may transmit the media feed to the computing device 104 for display. At 320, the mobile computing device 108 can determine whether a termination input has been received. For example, the termination input may be one or more clicks via a touchscreen of the mobile computing device 108. When the termination input has been received, the mobile computing device 108 can capture the media item and the technique 300 can proceed to 324. Otherwise, the technique 300 can return to 320. At 324, the mobile computing device 108 can transmit the captured media item to the computing device 104. Receipt of the captured media item at the computing device 104 can cause the computing device 104 to attach the captured media item into the electronic document. The technique 300 can then end or return to 304 for one or more additional cycles.

In another implementation, the selection of the selectable command can cause the computing device 104 to send an electronic message, such as an email or text message, to the mobile computing device 108. The purpose of this electronic message is to provide an easy way for the user 120 to transmit the captured media item to the computing device 104, i.e., by responding to the electronic message. For example, the computing device 104 could transmit an electronic message to the mobile computing device 108 stating "Please respond with your media item." In some implementations, the command could still be transmitted to the mobile computing device 108, which would cause the mobile computing device 108 to perform the media capture process via the media capture mode as discussed above. Subsequent to termination of the media capture mode, instead of automatically transmitting the captured media item back to the computing device 104, the user 120 could respond to the electronic message with the captured media item. This alternate feature could also remove the necessity of the short-range wireless communication link. That is, any network (WiFi, cellular, etc.) could be utilized.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   establishing, between a first computing device and a mobile computing device, a short-range wireless communication link;
   determining a context of an electronic document based on text within the electronic document descriptive of the context;
   in response to establishing the short-range wireless communication link, providing, by the first computing device, a plurality of selectable options for a user to attach a media item to the electronic document accessed by the first computing device, each of the plurality of selectable options being associated with a different type of the media item, the different types of the media item including at least two of a picture, an audio-only stream, a video-only stream, or an audio/video stream;
   in response to a user selection of one of the plurality of selectable options, transmitting, from the first computing device to the mobile computing device via the short-range wireless communication link, a command, the command configured to cause the mobile computing device to initiate a media capture mode during which the mobile computing device transmits a media feed of a current view of a camera of the mobile computing device to the first computing device via the short-range wireless communication link;
   displaying, at the first computing device, a preview window that includes the media feed;
   recognizing, by the first computing device, an object that corresponds to the context of the electronic document in the media feed of the preview window, wherein the media item is captured by the camera of the mobile computing device in response to recognizing the object and the mobile computing device configures the media capture mode for the type of media item associated with the user selection of the one of the plurality of selectable options;
   receiving, at the first computing device from the mobile computing device via the short-range wireless communication link, the captured media item; and
   in response to receiving the captured media item, attaching, by the first computing device, the captured media item to the electronic document.

2. The computer-implemented method of claim 1, further comprising:
   in response to the user selection of the one of the plurality of selectable options, sending an electronic message to the mobile computing device that requests the media item.

3. The computer-implemented method of claim 1, wherein the first computing device and the mobile computing device are associated with a same account.

4. The computer-implemented method of claim 1, wherein the first computing device includes a laptop computer or a desktop computer.

5. The computer-implemented method of claim 1, further comprising:
   determining, by the first computing device, whether the first computing device and the mobile computing device are associated with a same user account; and
   providing the plurality of selectable options in response to determining that the first computing device and the mobile computing device are both logged into the same user account.

6. The computer-implemented method of claim 1, wherein attaching the captured media item to the electronic document includes inserting the captured media item within the electronic document based on a location within the electronic document where an initial selection of one of the plurality of selectable options was performed.

7. The computer-implemented method of claim 1, further comprising providing the plurality of selectable options in a menu in response to a click by the user of a mouse, a trackball, or a trackpad of the first computing device.

8. The computer-implemented method of claim 1, wherein the electronic document is a web-based electronic document hosted by a remote server.

9. The computer-implemented method of claim 1, wherein the short-range wireless communication link is via Bluetooth or WiFi Direct.

10. A system comprising:
one or more processors; and
a memory that stores instructions that, when executed by the one or more processors, cause the one or more processors to perform operations comprising:
establishing, between a first computing device and a mobile computing device, a short-range wireless communication link;
determining a context of an electronic document based on text within the electronic document descriptive of the context;
in response to establishing the short-range wireless communication link, providing, by the first computing device, a plurality of selectable options for a user to attach a media item to the electronic document accessed by the first computing device, each of the selectable options being associated with a different type of the media item, the different types of the media item including at least two of a picture, an audio-only stream, a video-only stream, or an audio/video stream;
in response to a user selection of one of the plurality of selectable options, transmitting, from the first computing device to the mobile computing device via the short-range wireless communication link, a command, the command configured to cause the mobile computing device to initiate a media capture mode during which the mobile computing device transmits a media feed of a current view of a camera of the mobile computing device via the short-range wireless communication link;
displaying, at the first computing device, a preview window that includes the media feed;
recognizing, by the first computing device, an object that corresponds to the context of the electronic document in the media feed of the preview window, wherein the media item is captured by the camera of the mobile computing device in response to recognizing the object and the mobile computing device configures the media capture mode for the type of media item associated with the user selection of the one of the plurality of selectable options;
receiving, at the first computing device from the mobile computing device via the short-range wireless communication link, the captured media item; and
in response to receiving the captured media item, attaching, by the first computing device, the captured media item to the electronic document.

11. The system of claim 10, wherein the operations further comprise:
in response to the user selection of the one of the plurality of selectable options, sending an electronic message to the mobile computing device that requests the media item.

12. The system of claim 10, wherein the first computing device and the mobile computing device are associated with a same account.

13. The system of claim 10, wherein the first computing device includes a laptop computer or a desktop computer.

14. The system of claim 10, wherein the operations further comprise:
determining, by the first computing device, whether the first computing device and the mobile computing device are associated with a same user account; and
providing the plurality of selectable options in response to determining that the first computing device and the mobile computing device are both logged into the same user account.

15. The system of claim 10, wherein attaching the captured media item to the electronic document includes inserting the captured media item within the electronic document based on a location within the electronic document where an initial selection of one of the plurality of selectable options was performed.

16. The system of claim 10, wherein the operations further comprise:
providing the plurality of selectable options in a menu in response to a click by the user of a mouse, a trackball, or a trackpad of the first computing device.

17. A non-transitory computer-readable medium with instructions stored thereon that when executed by one or more processors, cause the one or more processors to perform operations, the operations comprising:
establishing, between a first computing device and a mobile computing device, a short-range wireless communication link;
determining a context of an electronic document based on text within the electronic document descriptive of the context;
in response to establishing the short-range wireless communication link, providing, by the first computing device, a plurality of selectable options for a user to attach a media item to the electronic document accessed by the first computing device, each of the selectable options being associated with a different type of the media item, the different types of the media item including at least two of a picture, an audio-only stream, a video-only stream, or an audio/video stream;
in response to a user selection of one of the plurality of selectable options, transmitting, from the first computing device to the mobile computing device via the short-range wireless communication link, a command, the command configured to cause the mobile computing device to initiate a media capture mode during which the mobile computing device transmits a media feed of a current view of a camera of the mobile computing device via the short-range wireless communication link;
displaying, at the first computing device, a preview window that includes the media feed;
recognizing, by the first computing device, an object that corresponds to the context of the electronic document in the media feed of the preview window, wherein the media item is captured by the camera of the mobile computing device in response to recognizing the object and the mobile computing device configures the media capture mode for the type of media item associated with the user selection of the one of the plurality of selectable options;
receiving, at the first computing device from the mobile computing device via the short-range wireless communication link, the captured media item; and
in response to receiving the captured media item, attaching, by the first computing device, the captured media item to the electronic document.

18. The non-transitory computer-readable medium of claim 17, wherein the operations further comprise:
in response to the user selection of the one of the plurality of selectable options, sending an electronic message to the mobile computing device that requests the media item.

19. The non-transitory computer-readable medium of claim 17, wherein the first computing device and the mobile computing device are associated with a same account.

20. The non-transitory computer-readable medium of claim 17, wherein the first computing device includes a laptop computer or a desktop computer.

\* \* \* \* \*